United States Patent [19]
Loichinger

[11] 3,744,405
[45] July 10, 1973

[54] SUPPORT FOR KNIFE ASSEMBLY IN CHEESE PROCESSING EQUIPMENT

[75] Inventor: Fred A. Loichinger, Manitowoc, Wis.

[73] Assignee: Stoelting Brothers Company, Kiel, Wis.

[22] Filed: May 24, 1972

[21] Appl. No.: 256,326

[52] U.S. Cl. .................................................. 31/48
[51] Int. Cl. ........................................... A01j 25/02
[58] Field of Search....................... 119/56 R; 31/48, 31/47

[56] References Cited
UNITED STATES PATENTS

| | | | |
|---|---|---|---|
| 3,476,272 | 11/1969 | Puta ................................. | 119/56 R |
| 3,490,751 | 1/1970 | Thomson ............................. | 31/48 |
| 2,488,053 | 11/1949 | Dampow................................. | 31/48 |
| 2,007,422 | 7/1935 | Dampow................................. | 31/48 |

*Primary Examiner*—Robert Peshock
*Assistant Examiner*—J. Q. Lever
*Attorney*—John W. Michael, Joseph A. Gemignani et al.

[57] ABSTRACT

A carriage is mounted for movement between opposite ends of a cheese processing vat. A knife assembly is suspended from the carriage and the support for the knife assembly includes an elongated, circular in cross section member extending parallel to the direction of travel of the carriage and connection of the knife assembly to that elongated member is made through a bracket assembly having a tubular sleeve surrounding and slideable on that member. The connection between the knife and the bracket assemblies is such that as the carriage moves relative to the vat, tending to move the knife assembly through a medium in the vat, a force is generated which binds the tubular sleeve of the bracket assembly on the elongated support member thereby locking the bracket assembly on the support so that the knife assembly is carried through the vat by the carriage. The binding engagement with the support can be selectively released to permit relative movement of the support and the knife assembly to properly position the knife assembly for complete travel up to the opposite longitudinal ends of the vat.

8 Claims, 3 Drawing Figures

SUPPORT FOR KNIFE ASSEMBLY IN CHEESE PROCESSING EQUIPMENT

BACKGROUND OF INVENTION

This invention relates to cheese processing equipment and, more particularly, to arrangements for supporting curd knives with respect to a cheese processing vat.

Much of the processing of various types of cheese, cottage, cheddar, swiss, etc., is carried out in vats. At various stages in the processing, the curd tends to amalgamate into a somewhat homogeneous mass. Since the curd is best processed at various stages in chunk form, this amalgamation is undesirable. Common practice has been to utilize wire structure knives, or cutters, which are drawn through the curd in the vat to cut the curd into cubes.

Among the problems with prior art cutting arrangements has been to automate the cutting operation as much as possible while insuring a complete and thorough cut through all of the curd contained in the vat.

SUMMARY OF INVENTION

Among the general objects of this invention is to provide a generally automated arrangement for moving a curd knife assembly through a vat and, moreover, to do so in a manner which insures thorough cutting of all of the medium contained in the vat.

For the achievement of these and other objects, this invention proposes an arrangement for supporting a knife assembly from a carriage such that the knife assembly is movable with the carriage to achieve the cutting operation and also providing for selective release of the knife assembly for relative movement between it and the carriage to properly position the knife assembly to insure complete travel of that assembly between the opposite ends of the processing vat. More specifically, a track is provided along an elongated vat and a carriage is mounted for movement along that track. A knife assembly is mounted on an elongated support which is in turn connected to the carriage. The connection between the knife assembly and the elongated support member is such that the knife assembly is connected for joint movement with the carriage as the later moves along the track but can be selectively released to permit the carriage and correspondingly the support assembly, to move relative to the knife assembly to position the knife assembly for movement up to the opposite ends of the vat.

Preferably, the support assembly includes an elongated, generally circular in cross section portion and a generally tubular sleeve is engaged on that elongated portion for sliding movement thereon. The sleeve is connected to a bracket assembly which engages and supports the knife assembly. The connection between the bracket and knife assemblies is such that a force is transmitted to the sleeve, in response to carriage movement tending to move the knife assembly through the vat, which binds the sleeve on the elongated support portion so that the knife assembly moves jointly with the carriage. At both of the extreme ends of travel of the carriage, the sleeve can be released from its binding engagement on the elongated support member and held to permit the latter to move freely and thus position the carriage and the support assembly such that when the sleeve again binds on the elongated support member the knife assembly can be moved completely up to the end of the vat.

Other objects and advantages will be pointed out in, or be apparent from, the specification and claims, as will obvious modifications of the embodiment shown in the drawings, in which:

DESCRIPTION OF PREFERRED EMBODIMENT

Figure 1:
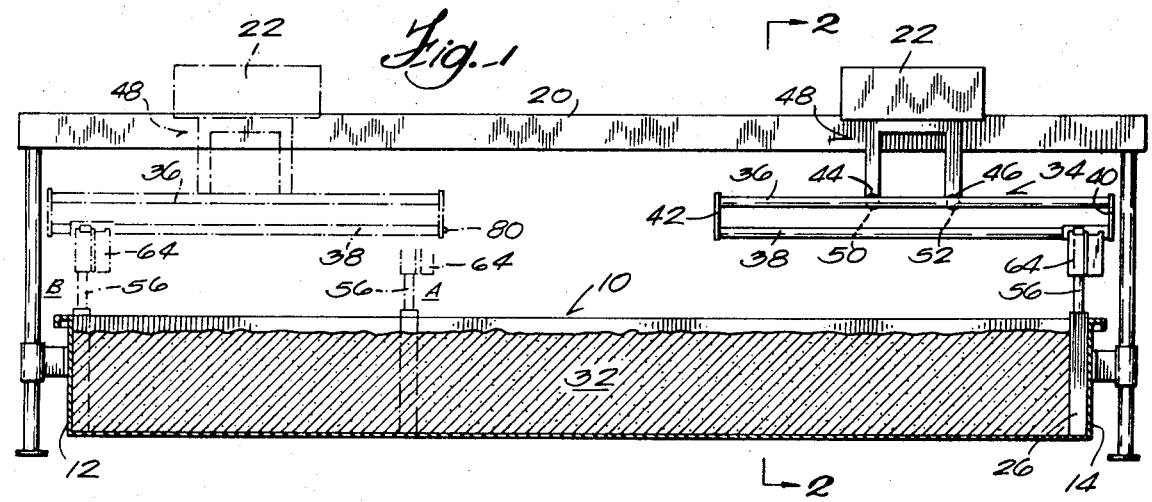
FIG. 1 is a side elevation of a processing vat assembly incorporating this invention.

With particular reference to the drawings, a conventional cheese processing vat 10 includes opposite ends 12 and 14 and side walls 16 and 18. The ends of vat 10 are squared.

A track 20 is positioned above and extends the length of vat 10. Self-propelled carriage 22 is engaged on track 20 for movement along the entire length thereof in both directions. Track 20 and carriage 22 can be of any conventional construction and hence the details thereof have not been illustrated and will not be described.

Figure 2:
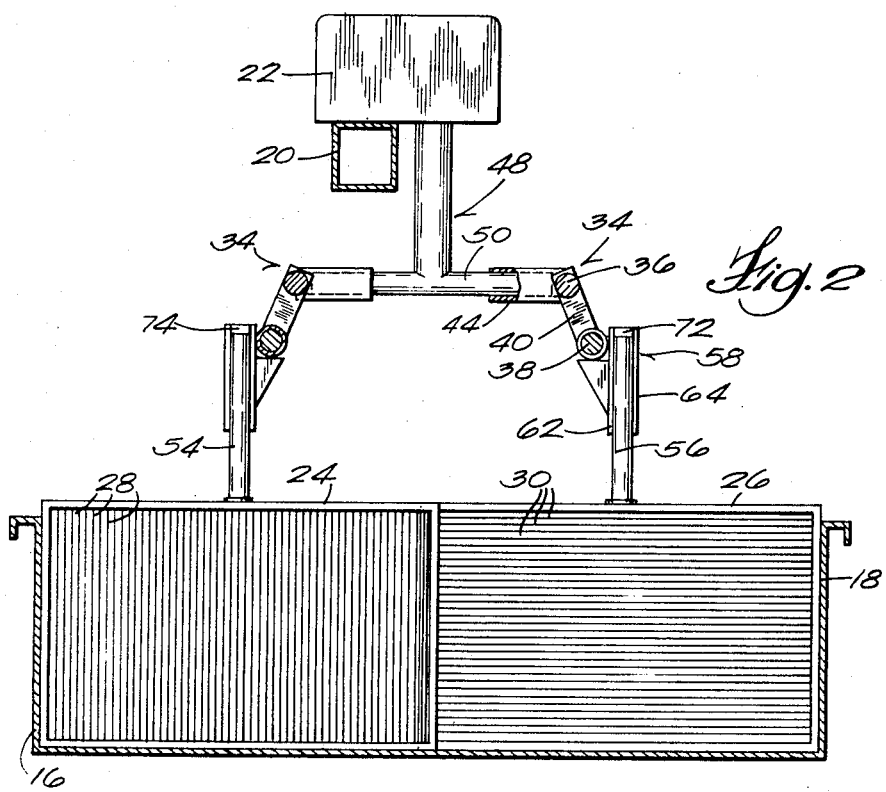
FIG. 2 is a section view generally along line 2—2 in FIG. 1.

A pair of curd knives 24 and 26 are suspended from carriage 22 in a manner to be described more completely hereinafter. Curd knives 24 and 26 can be of any conventional construction. For purposes of understanding this invention a general description of the knives should be sufficient. More particular, each of the knife assemblies 24 and 26 includes a plurality of wires, 28 in assembly 24 and 30 in assembly 26. These wires are spaced apart to attribute a generally open construction to the knives with the wires providing the cutting edges. As can be seen in FIG. 2, wires 28 are arranged vertically in knife assembly 24 whereas wires 30 of knife assembly 36 are arranged horizontally. When the knife assemblies are drawn through curd 32 contained in vat 10, wires 28 and 30 make vertical and horizontal cuts through the curd. After the knives have completed their travel in one direction, their position will be reversed and they will again traverse the length of the vat cutting the curd into elongated rectangular shaped strips. After this cutting operation, the curd will be cut at right angles to the cuts just described to render the curd into a cube shape.

The problem with such cutting assemblies is to insure complete cutting of the curd up to the ends of the vat. As can be seen from a study of FIG. 1, if the knife assemblies are supported such that they will travel up to one of the ends of the vat, the position of the knife assemblies relative to the carriage will then be such that they cannot do the same at the opposite end of the vat. In order to solve this problem, and to permit the knife assemblies to be supported from a conventional carriage i.e., a carriage which can also support pusher and steering paddle assemblies for operation in the vat, a support assembly is proposed whereby the knives are supported for joint movement with the carriage relative to the vat but can be released for movement relative to the carriage to be positioned such as may be required for travel up to the ends of the vat.

More particularly, an elongated support assembly 34 is provided on each side of carriage 22, i.e. one such support assembly for each of the knife assemblies. Since the support assemblies and their connection to the knife assemblies are identical, only one will be described. Support assembly 34 includes first and second elongated rods 36 and 38. Rod 38 has a generally circular cross section. Rods 36 and 38 are interconnected by end plates 40 and 42, with rod 38 having a bolted connection to the end plates for reasons which will appear hereinafter. Two hollow tubes 44 and 46 are attached to rod 36. Mounting bracket assembly 48 is connected to and depends from carriage 22 and includes a pair of laterally projecting arms 50 and 52. Tubes 44 and 46 of the support assembly are spaced apart so as to fit over arms 50 and 52 to connect the support assembly 44 to the bracket assembly and correspondingly to the carriage for movement therewith. This provides a relatively simple releasable connection between the knife support assembly and the carriage assembly.

Knife assemblies 24 and 26 include a vertically extending arm 54 and 56. These arms engage a second mounting bracket assembly 58 through which the actual connection of the knife assemblies to the support is accomplished. More specifically, bracket assembly 58 includes a sleeve 60 which fits around rod 38 but has a length which is substantially less than the length of the rod. Portion 60 has a sliding fit on rod 38 so that it is capable of moving on the rod. The bracket assembly also includes spaced plates 62 and 64, the latter connected to tubular member 60 and the two plates are interconnected by central, vertically extending brace 66. The upper ends of plates 62 and 64 are notched such that they together with brace 66 define upwardly opening notches 68 and 70 on opposite sides of brace 66. Generally rectangular plates 72 and 74 are attached to the tops of arms 54 and 56 and have a size and configuration generally similar to notches 68 and 70 so that they can be positioned in those notches. Accordingly, the knife assemblies can be positioned relative to bracket assembly 58 such that either blocks 72 or 74 fit into notches 68 or 70 with arm 54 or 56 extending downwardly along one of the opposite sides of brace 66.

If the direction of travel of the carriage is to the left as viewed in the drawings, the arms of the knife assembly, i.e. 54 or 56, will be positioned in notches 70.

Figure 3:
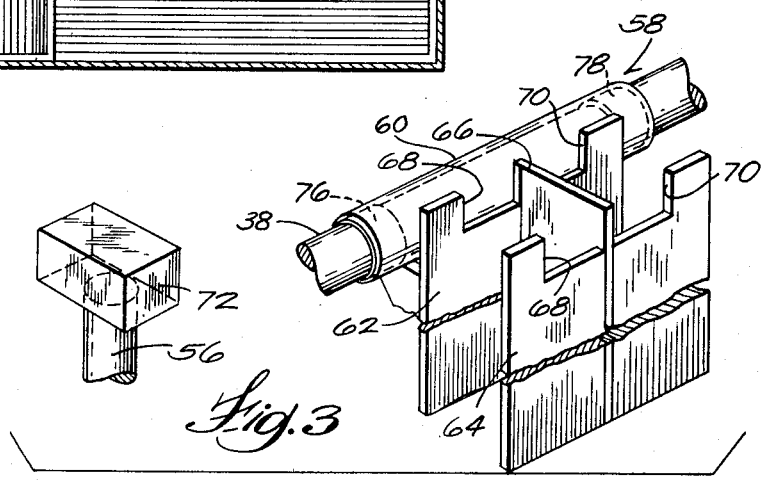
FIG. 3 is an enlarged perspective view of the knife assembly connection in the support.

As can be viewed in FIG. 3, the bore of sleeve 60 is preferably made somewhat larger than the circumference of rod 38 and nylon bushing 76 and 78 are provided at the opposite ends of the sleeve to provide a close sliding fit.

With the construction described to this point, it will be noted that the bracket assembly 58 can be moved longitudinally along rod 38 to position it at any given point relative to the carriage. After it has been positioned and the knife assembly connected in the notch and register connection provided by plates 72 and 74 and notches 68 and 70, carriage movement can be initiated. As viewed in FIG. 1, as the carriage moves to the left support assembly 34 will move with the carriage while the load of the knife assembly and bracket assembly 58 will provide some drag between the sleeves 60 and rods 38. This drag will tend to draw the knife assemblies through the curd 32. Arm 54 abutting brace 66 will create a force tending to bind the sleeve 60 on rod 38 to counteract any tendency of the sleeve to slide on the rod. By virtue of this binding action, the bracket assembly and consequently the knife assembly, will move jointly with support assembly 34 and the carriage. With the knife assemblies having started with the relationship with the carriage illustrated by the full lines in FIG. 1, when the carriage reaches the extreme end of its travel to the left the knife assembly will be spaced a considerable distance from end 12 of the vat (position A in FIG. 1). At this point, bracket assembly 58 can be held and the carriage reversed, or moved to the right. The bracket being held, rod 38 slides freely through sleeve 60. After the carriage has been backed to the right a sufficient distance, it is stopped, bracket assembly 58 released, and the carriage again driven to the left which will produce the binding action of sleeve 60 on rod 38 and move the knife assemblies to position B at the extreme left end of the vat. With the cut having been taken completely through the length of the vat, blade assemblies 24 and 26 can be reversed in position and again driven the length of the vat in the same manner as just described.

The knife assembly supports can be readily assembled onto and removed from the carriage by virtue of the rod and tube connections 50, 52 and 44, 46. Similarly bracket assembly 58 can be replaced by merely loosening bolt 80 and sliding sleeve 60 off of rod 38.

Although but one embodiment of the present invention has been illustrated and described, it will be apparent to those skilled in the art that various changes and modifications may be made therein without departing from the spirit of the invention or from the scope of the appended claims.

I claim:

1. Apparatus of the type described comprising, in combination, an elongated vat, a track extending along said vat, a carriage mounted for movement along said track, a curd knife assembly, a support assembly having a longitudinal extension, a mounting bracket assembly attached to and movable with said carriage and connecting said support assembly to said carriage for movement therewith and with the longitudinal extension of said support assembly generally parallel to the longitudinal extension of said vat, and means connecting said curd knife assembly to said support assembly for movement jointly therewith and selectively for movement relative thereto so that at opposite ends of said vat relative movement between said curd knife assembly and said mounting bracket assembly can be utilized to achieve complete movement of said knife assembly to the ends of said vat.

2. The combination of claim 1 wherein said support assembly includes a generally elongated portion having an extension generally parallel to said vat extension, said connecting means includes a generally hollow tubular member disposed on and slideable relative to said elongated portion of said support assembly, said hollow tubular member having a length less than the extension of said support assembly elongated portion so that it is movable to a variety of positions thereon, and wherein said connecting means further includes means connecting said curd knife relative to said hollow tubular member so that said hollow tubular member binds on said elongated portion of said support assembly as a result of movement of said knife assembly through medium in said vat.

3. The combination of claim 1
wherein said curd knife assembly includes an arm extending therefrom,
said support assembly includes a generally elongated portion extending generally parallel to said vat extension,
said connecting means includes a generally hollow tubular member disposed on and slideable relative to said elongated portion of said support assembly, said hollow tubular member having a length less than the extension of said support assembly elongated portion so that it is movable to a variety of positions thereon,
a bracket connected to said hollow tubular member,
means defining a separable notch and register connection between said arm and bracket through which said curd knife assembly is connected to said hollow tubular portion for movement therewith,
and a brace fixed to said bracket to engage said arm when said notch and register connection is made and transmit a binding force to said hollow tubular member relative to said tubular portion of said support assembly as said carriage moves on said track tending to move said knife assembly through said vat.

4. The combination of claim 3
wherein said mounting bracket assembly includes at least one laterally extending support projecting from the extension of said track,
and wherein said support assembly includes a coupling extension telescoping on said support projection to make the connection between said support assembly and said carriage and being selectively releasable from said support projection.

5. The combination of claim 1
wherein said track is positioned above and extends the length of said vat,
wherein said support means includes an elongated generally circular in cross section portion suspended beneath said carriage and extending generally parallel to said track and the longitudinal axis of said vat,
wherein said knife assembly includes a vertically projecting arm,
wherein said connecting means includes a generally hollow tubular member slideably disposed on said elongated portion of said support means and having a length less than the extension of said support assembly elongated portion so that said hollow tubular member is movable to a variety of positions thereon,
wherein said connecting means further includes a bracket assembly,
and including means engageable between said vertical arm and said bracket assembly for transmitting a force tending to bind said hollow tubular member on said support means elongated portion as a result of movement of said knife assembly through a medium in said vat.

6. The combination of claim 5
including means defining a separable notch and register connection between said knife assembly arm and said bracket assembly,
and wherein said bracket assembly includes a brace positioned adjacent said knife assembly arm when said notch and register connection is engaged and against which said arm bears as said carriage moves said knife assembly through a medium in said vat to cause said tubular portion to bind on said elongated portion for movement therewith.

7. The combination of claim 6 wherein
said bracket assembly includes an upwardly opening generally rectangular notch adjacent said brace,
and said arm includes a generally rectangular projection having a similar shape and size to said notch for registry into said notch to form said notch and register connection.

8. The combination of claim 7 wherein said brace has oppositely directed surfaces facing in the direction of travel of said carriage and said bracket assembly includes one of said notches on both sides of said brace.

* * * * *